United States Patent [19]

Nakaoka et al.

[11] Patent Number: 5,734,460
[45] Date of Patent: Mar. 31, 1998

[54] PHOTOSENSITIVE MATERIAL PROCESSING APPARATUS WHICH ENSURES A SATISFACTORILY DETERMINED FRAME BOUNDARY

[75] Inventors: Nobuaki Nakaoka; Shin-ichi Oka, both of Wakayama, Japan

[73] Assignee: Noritsu Koki Co., Ltd., Wakayama, Japan

[21] Appl. No.: 508,450

[22] Filed: Jul. 28, 1995

[30] Foreign Application Priority Data

Jul. 28, 1994 [JP] Japan .................................. 6-176260

[51] Int. Cl.[6] .......................... G03B 29/00; G03B 27/52
[52] U.S. Cl. ............................................. 355/29; 355/40
[58] Field of Search ............................ 355/38, 40, 41, 355/29

[56] References Cited

U.S. PATENT DOCUMENTS

| | | | |
|---|---|---|---|
| 4,728,996 | 3/1988 | Matsumoto | 355/41 X |
| 5,128,519 | 7/1992 | Tokuda | 355/41 X |
| 5,383,035 | 1/1995 | Suzuki | 355/40 X |

*Primary Examiner*—Fred L. Braun
*Attorney, Agent, or Firm*—Wenderoth, Lind & Ponack

[57] ABSTRACT

An apparatus to process photosensitive material, such as a film, on which is recorded a sequence of frames. The boundary of a frame must be satisfactorily determined to permit the cutting of the frame. If a boundary cannot be satisfactorily detected, a modification process involving the selective positioning of the film will be executed to align the film for cutting purposes.

16 Claims, 7 Drawing Sheets

5,734,460

PHOTOSENSITIVE MATERIAL PROCESSING APPARATUS WHICH ENSURES A SATISFACTORILY DETERMINED FRAME BOUNDARY

FIELD OF INVENTION

This invention relates to photosensitive material processing equipment.

BACKGROUND OF THE INVENTION

For photosensitive material processing equipment involving the advancing of photosensitive material (for example, developed film or printing paper) on which there is serially recorded a plurality of frames of pictures, there must be means for positioning the photosensitive material according to the recorded positions of the picture frames. Position control is based on:

(i) the quantity of the photosensitive material advanced (as determined by the quantity advanced determining means) and (ii) the boundary information of framed pictures (as determined by boundary determination means).

In other words, the distance between the position of a frame boundary (determined by boundary determining means) and the position of a frame boundary in the appropriate position in the processing portion, is pre-measured. After a frame boundary is determined, the photosensitive material is advanced the pre-measured distance, then stopped, and its position is determined by a processing portion. Therefore, to position properly, it is necessary for the boundary detecting means, in the processing portion, to detect the boundary properly.

In the photosensitive material, there is usually a clear density difference between the recorded picture frame part and the surrounding blank part. This density difference can be determined by a boundary determining means to be the picture boundary.

But sometimes the density difference between the picture part and the blank part is not clear because of the object information recorded on the photosensitive material or because the blank part between adjacent frames is extremely narrow. Either situation makes picture boundary determination difficult.

In such situations, conventional automatic locating is impossible, so a human operator must personally watch the position of the photosensitive material in order to manually activate the input means to input a modify command to position the photosensitive material.

OBJECTIONS OF THE INVENTION

It is not always easy to know the exact position of the photosensitive material in the process portion by its structure. Operating efficiency is low because every time an unsatisfactory boundary frame is determined by boundary determining means, a time-consuming position determining procedure is necessary.

This invention aims to improve the operational efficiency and reliability of photosensitive material processing equipment.

SUMMARY OF THE INVENTION

Photosensitive material processing equipment of the invention comprises: advancing means for advancing the photosensitive material having serially recorded frames of pictures; advanced quantity determining means for determining the quantity of said photosensitive material advanced by said advancing means; boundary determining means for determining the picture boundary of adjacent frames in said advanced photosensitive material; a processing portion for processing of said advanced photosensitive material; position control means for advancing said photosensitive material based on information determined by said advanced quantity determining means and boundary determining means; and modify input means for inputting of a modify command to move the position of said photosensitive material by said position control means.

The first feature includes picture reading means to read a picture on the photosensitive material at the input-side of said processing portion on the advancing path and a display monitor for displaying information read by said picture reading means. If the boundary determination by said boundary determination means is unsatisfactory, said monitor shows a modify indicator for executing the modifying process according to information read by said picture reading means.

The second feature (in conjunction with the first featured construction) includes a monitor which displays: (i) a modify position index based on advanced photosensitive material during the execution of the modifying process, if boundary determination is unsatisfactory and (ii) a set position index based on information of the boundary being satisfactorily determined by boundary determining means.

The third feature (in conjunction with the first featured construction) is that the monitor displays the modify position index of an estimated-boundary position from the advanced quantity of photosensitive material if the boundary determination is unsatisfactory during execution of the modifying process of the first featured construction, with pictures of plural frames serially positioned based on information read by said picture reading means.

The fourth feature (in conjunction with the first to third featured constructions) is a positioning stage (DS) for visual positioning of the photosensitive material by the operator. If an unable-to-modify message input occurs during the execution of the modifying process, said position control means advances the unable-to-position place in the photosensitive material to the positioning stage (DS) and then automatically indicates to the advancing means to stop advancing.

The fifth feature (in conjunction with the first to fourth featured constructions) is that, on the input-side of the processing portion at the advancing path of the photosensitive material, there is an advancing state for advancement of the photosensitive material toward the process portion which is freely switchable with a discharging state for the removal or picking out of the photosensitive material from the advancing path.

The sixth feature (in conjunction with the fifth featured construction) is that during execution of said modifying process if an unable-to-modify message input occurs, said position control means commands the advancing means to advance the photosensitive material towards a removal or pick-out portion. Furthermore, the invention is constructed so as to switch said removal portion from said advancing state to said discharging state.

The seventh feature (in conjunction with the first to sixth featured constructions) is that on the immediate input-side of the processing portion on the advancing path of the photosensitive material, there is an auxiliary boundary determining means to determine the picture boundary of adjacent frames of the photosensitive material. Said position control means compares between determined information of the boundary determining means and determined information of the auxiliary boundary determining means and then detects differences of the advanced quantity of photosensitive material at each determining place.

The eighth feature (in conjunction with the first to seventh featured constructions) is that there is contrast adjusting means to adjust the contrast of picture displayed on the monitor based on information read by said picture reading means.

The ninth feature (in conjunction with the first to eighth featured constructions) is that said photosensitive material is photographic film and there is an exposure portion to expose a picture on the film to printing paper at a position determined by position control means.

The tenth feature (in conjunction with the eighth featured construction) is that the modifying process is executed when the number of continuous frames for which a boundary cannot be satisfactorily determined by boundary determining means, exceeds a predetermined limit. If the number is less than or equal to a predetermined limit, the film is advanced by one frame and then the position is determined.

The eleventh feature (in conjunction with the first to eighth featured constructions) is that said photosensitive material is photographic film, and the process portion cuts the photosensitive material at positions between frames set by position control means.

The twelfth feature (in conjunction with the eleventh featured construction) is that during execution of said modifying process, if an input of an unable-to-modify message occurs, then the "between frame" position nearest to the output-side of the advancing path of the photographic film is set by said position control means to be the new cut position setting.

The thirteenth feature (in conjunction with the eleventh and twelfth featured construction) is said position control means determines if there has been a satisfactory determination by said boundary determining means of the boundary of each frame of a preset number of advancing frames from said cut position setting means. The modifying process is executed only if the boundary determination of one or more frames is unsatisfactory.

The fourteenth feature (in conjunction with the first to eighth featured constructions) is said photosensitive material is film and said processing portion includes an exposure portion to expose a picture of said film to print paper, and a film cutting portion to cut said film upon every predetermined number of frames at a cut position setting between adjacent frames to be cut.

The fifteenth feature (in conjunction with the fourteenth featured construction) is said position control means executes said modifying process if the number of continuous frames for which a boundary cannot be satisfactorily determined by said boundary determining means exceeds a predetermined limit of continuous frames; and advances said film a set quantity equivalent to one frame of film to determine the position if the number of continuous frames for which a boundary cannot be satisfactorily determined by said boundary determining means continues within the predetermined limit of frames. Furthermore, said advancing means identifies satisfactory boundary determinations of one or more frames of the cut position setting by boundary determining means. It is so constructed to execute said modifying process only if one or more frame boundary determinations is unsatisfactory.

According to the first feature, the position control means has the monitor show a modify indicator to position the photosensitive material, and executes the modifying process if the boundary determining of a picture is unsatisfactory. In other words, the position of photosensitive material read by said picture reading means can be based on the advanced quantity of photosensitive material determined by advanced quantity determining means. The photosensitive material area shown on the monitor at any position can be held. But the monitor display is not capable of indicating for certain whether the boundary determination has been completed or not.

Now, watching the monitor, the operator inputs a command from modify input means specifying the frame position of a picture boundary which was not satisfactorily determined, then it is able to ensure information for position control at the processing portion by position control means.

According to the second feature of the invention, when the boundary determining means is unable to satisfactorily determine the boundary of picture, the monitor shows pictures read by said picture reading means the picture boundaries of satisfactorily determined frames by boundary determining means. The monitor shows frames without satisfactorily determined picture boundaries, and a modify position index indicating a fixed relationship with the position of the picture and an advanced quantity of photosensitive material utilizing the fact that each frame on the photosensitive material is arranged in substantially equal pitch.

The modify position index is shown by estimation of position. The operator then, watching the monitor, inputs a modify command from the modify input means to hold the fixed position relationship between the modify position index and picture frames without satisfactorily determined picture boundaries. During this input operation, operator can input the modify command referring to the set position index on the monitor and the positional relationship of picture frames related to the set position index. So, based on input information, information for locating control at the processing portion of photosensitive material can be ensured.

According to the third feature of the invention, when the boundary determining means cannot satisfactorily determine the picture boundary, position control means operates to display on the monitor the modify position index indicating a fixed position relationship, estimated from the advanced quantity of photosensitive material, with frames whose boundaries were not satisfactorily determined read by said picture reading means, with pictures of serially positioned plural frames.

When the monitor shows this information, the modify position index is shown at an estimated position, and the location of the modify position index is not fixed relative to the frames with boundaries not satisfactorily determined. Watching the monitor, the operator then inputs modify command by modify input means, to correctly position the unsatisfactorily determined picture boundary. During the input operation, the operator can input the modify command by finding the subject position of boundary pictures of the frames whose boundaries were not satisfactorily determined, from pictures of plural frames arranged on the monitor screen. So, information for locating control at the process portion, based on input information, can be ensured by position control means.

According to the fourth feature of the invention, even while position control means executes the modifying process, when the displayed picture on the monitor is not clear and the operator is unable to input a modify command and instead inputs an unable-to-modify message, position control means advances the unable-to-modify position in the photosensitive material to a positioning stage (DS). Operator then is able to execute positioning of the photosensitive material visually at the positioning stage (DS).

According to the fifth feature of the invention, an advancing path opening gate equipped at the input-side of the processing portion on the advancing path of the photosensitive material can be switched to a discharging state from the advancing state so the photosensitive material can be taken outside of the advancing path before it reaches the process portion.

According to the sixth feature of the invention, even while position control means executes the modifying process, when the monitor display is not clear, as operator inputs an unable-to-modify message because he cannot satisfactorily input a modify command, the position control means advances photosensitive material, corresponding to the part of the modifying process during input of the unable-to-modify message, to the outside of the advancing path from the advancing path opening gate which has been switched to the discharging state.

According to the seventh feature of the invention, the distance between boundary determining means and processing portion is sometimes quite long depending on the structure of the processing portion and the picture reading means. Even in this case, position control means compares determined information of the boundary determining means with determined information of an auxiliary determining means equipped at an immediate place to the input-side of the processing portion and determine advanced quantity differences of photosensitive material at each determining position. Therefore, the advanced quantity of photosensitive material at the processing portion can be exactly held and also its positioning can be precisely executed.

According to the eighth feature of the invention, while the operator watches the monitor and inputs a modify command for positioning of photosensitive material, the boundary part of the picture can be adjusted to be seen more clearly by adjusting the contrast of the picture on the monitor through contrast adjusting means.

According to the ninth feature of the invention, at the processing portion composed of an exposure portion, the picture of a film frame is exposed on photographic paper.

Regarding exposure of a picture on printing paper, the subject part of the picture of a frame of film can be satisfactorily exposed to printing paper by satisfactorily positioning the film at exposure portion.

According to the tenth feature of the invention, position control by boundary determining means occurs continuously, if a continued number of such frames is within a predetermined limit, positioning is executed by advancing a set quantity equivalent to one frame of film without execution of the modifying process. The modifying process will be executed if the continued number of frames exceeds it predetermined limit.

In other words, the exposed part of the film is somewhat narrower than the entire area of film, so there is tolerance for position difference between the terminal space of the exposed part and the partition part of the picture boundary.

Consequently, even when positioning of said predetermined number of frames is executed by advancing a set quantity equivalent to one frame of film without reference to determined information of boundary determining means, the need for the modifying process of position control means and its accompanied input of a modify command by operator can be reduced by a predetermined number of frames within the tolerance area of said position difference.

According to the eleventh feature of the invention, at the processing portion composed of a film cutting portion, the process of film as the photosensitive material requires the film to be cut at a cut position setting for cutting between frames upon every predetermined number of frames to be separated.

This film cutting is for filing and storage of film such as negative sheets. The predetermined number to be cut is ordinarily four or six frames.

By said feature construction, film can be satisfactorily cut by proper positioning of the film at the film cutting portion.

According to the twelfth feature of the invention, even while the execution of the modifying process by position control means when the monitor is not clear and the operator inputs an unable-to-modify message because he is not able to input a modify command, the position control means executes the positioning to the nearest position between frames as the new cut position setting on the output-side of the advancing path of film of cut position setting to cut the film at the predetermined number of frames.

For instance, when a frame in between the position of the sixth and seventh frames is set as the cutting position of a certain film, and the modifying process receives an unable-to-modify message, the nearest frame position between the output-side of advancing path of film and the cut position setting, such as the position between the fifth and sixth frames, will be set as new cut position setting at film cutting portion.

According to the thirteenth feature of the invention, the position control means identifies frame boundaries of one or more frames having been satisfactorily determined by boundary determining means, and upon every advance of the cut predetermined number of frames of film by advancing means, executes the modifying process only in unsatisfactory situations. In other words, the modifying process is executed when there is a satisfactory determination of boundary only to a frame boundary of the two sides of the cut position setting or the position near the cut position setting. For a frame boundary positioned far from the cut position setting, the frame number only can be identified without identification of a satisfactory determination of boundary and execution of modifying process in unsatisfactory condition.

According to the fourteenth feature of the invention, the processing portion composed of the exposure portion, while processing film as the photosensitive material, executes exposure to printing paper of a frame picture of film. The film cutting portion of the same process portion, executes the cut position setting between frames for separation of every cut predetermined number of frames of film.

To execute said process to film at these process portions, positioning of film is needed. When the picture boundary determination by the boundary determining means becomes unsatisfactory, position control means shows the modify command on the monitor for positioning at both process portions. So, the operator can execute the process for positioning at both process portions while watching the monitor.

According to the fifteenth feature of the invention, regarding the position control means during the process for positioning at the exposure portion even when a frame boundary is unable to be determined at the boundary determining means, positioning is executed by advancing only a set quantity equivalent to one frame of film without the modifying process if the number of continuous frames is within a predetermined limit of frames. The modifying process will be executed if the number of continuous frames exceeds a predetermined limit. And, regarding the process for positioning at the film cutting portion, upon every advance of a cut predetermined number of frames by the advancing means, identifying if the boundary determining means determine the frame boundary of one or more of the serially arranged cut position settings, then the modifying process will be executed only in unsatisfactory conditions.

In other words, at the exposure portion with tolerance to positioning, even if the boundary determining means cannot satisfactorily determine the picture boundary, the frequency of executing the modifying process should be suppressed as much as possible to obtain more precise positioning at the film cutting portion, the modifying process will be executed in identifying a satisfactory determination of the boundary and unsatisfactory conditions to the frame boundary near the frame boundary of two sides of the cut position setting. As to the frame boundary at a distant place from the cut position setting, identification of a satisfactory determination of the boundary and the number of frames in an unsatisfactory condition without the modifying process can be made, then the modifying process can be precisely executed while the executing frequency is suppressed as much as possible, corresponding to the structure of the process portion.

According to the first feature, the operator can input a modify command for positioning the photosensitive material at the processing portion while watching the monitor. Compared with the input of a modify command of position by directly watching the position of photosensitive material at the process portion, it makes the operation of positioning at the processing portion easy. Consequently the operating efficiency of the equipment is increased.

According to the second feature, the operator can input a modify command while referring to the positional relationship between the set position index on the monitor and the picture of its related frame. This makes the operation easier for positioning at the processing portion. Consequently, further improvement of operating efficiency of the equipment can be obtained.

According to the third feature, the operator can input a modify command while estimating the position of subject frames, whose picture boundary is not satisfactorily determined, from the arranged plurality of picture frames on the monitor. This makes the operation easier for positioning at the processing portion. Consequently, further improvement of operating efficiency of the equipment can be obtained.

According to the fourth feature, even when input of modify command by watching the monitor is difficult, providing visual positioning at the positioning stage (DS) can be considered as a remedy in an emergency situation. Thus the improved reliability of the equipment shows the effects of said first, second and third features.

According to the fifth feature, the photosensitive material can be removed from the advancing path before it reaches the process portion. This can be applied, for example, to the situation where the inability of the boundary determining means to satisfactorily determine the picture boundary continues abnormally. In such a case, the photosensitive material can be picked out before it is processed by the process portion. This can be considered as a remedy in an emergency situation and this improves the reliability of the equipment.

According to the sixth feature, when the input of the modify command by watching the monitor is difficult, the photosensitive material will be discharged from the advancing path opening gate automatically without being processed by the process portion. This simplifies operation under the difficult condition of the input of the modify command.

According to the seventh feature, advancing a quantity of photosensitive material at a processing portion can be precisely controlled, so that positioning at the processing portion can be exactly executed. Thus improving reliability of the equipment shows effects of said first, second, third, fourth, fifth and sixth features.

According to the eighth feature, the modify command can be executed easily because it is easy to see the picture boundary on the monitor. Thus, further improvement of operating efficiency of the equipment can be achieved.

According to the ninth feature, film at the exposure portion is satisfactorily positioned due to said first, second, third, fourth, fifth, sixth, seventh and eighth features. It is able to expose the relevant part of the frame picture of the film to the printing paper satisfactorily.

According to the tenth feature, the trouble with the modifying process by position control means and the input of the modify command by operator can be reduced. This further improves the operating efficiency of the equipment.

According to the eleventh feature, the film at the film cutting portion is satisfactorily positioned due to first, second, third, fourth, fifth, sixth, seventh and eighth features, and can be cut at the cut position setting satisfactorily. This shows the effectiveness of first, second, third, fourth, fifth, sixth, seventh and eighth features.

According to the twelfth feature, even cutting at the cut position setting originally set may be difficult. Therefore, a new cut position setting is set. This is expected to smooth the operation for positioning at the film cutting portion. Thus the operating efficiency of the equipment can be further improved.

According to the thirteenth feature, the difficulties of the operations needed in the modifying process are reduced while the process of necessary positioning is exactly executed. Thus operating efficiency of the equipment can be further improved.

According to the fourteenth feature, the operator can execute the process for positioning at both process portions while watching the monitor. Thus operating efficiency of the equipment can be further improved.

According to the fifteenth feature, the modifying process is executed according to the structure of process portion. Thus operating efficiency of the equipment can be further improved.

BRIEF DESCRIPTION OF THE DRAWINGS

Preferred embodiments of the invention will be described in conjunction with the following Figures.

DETAILED DESCRIPTION OF THE PREFERRED EMBODIMENT

Figure 1:
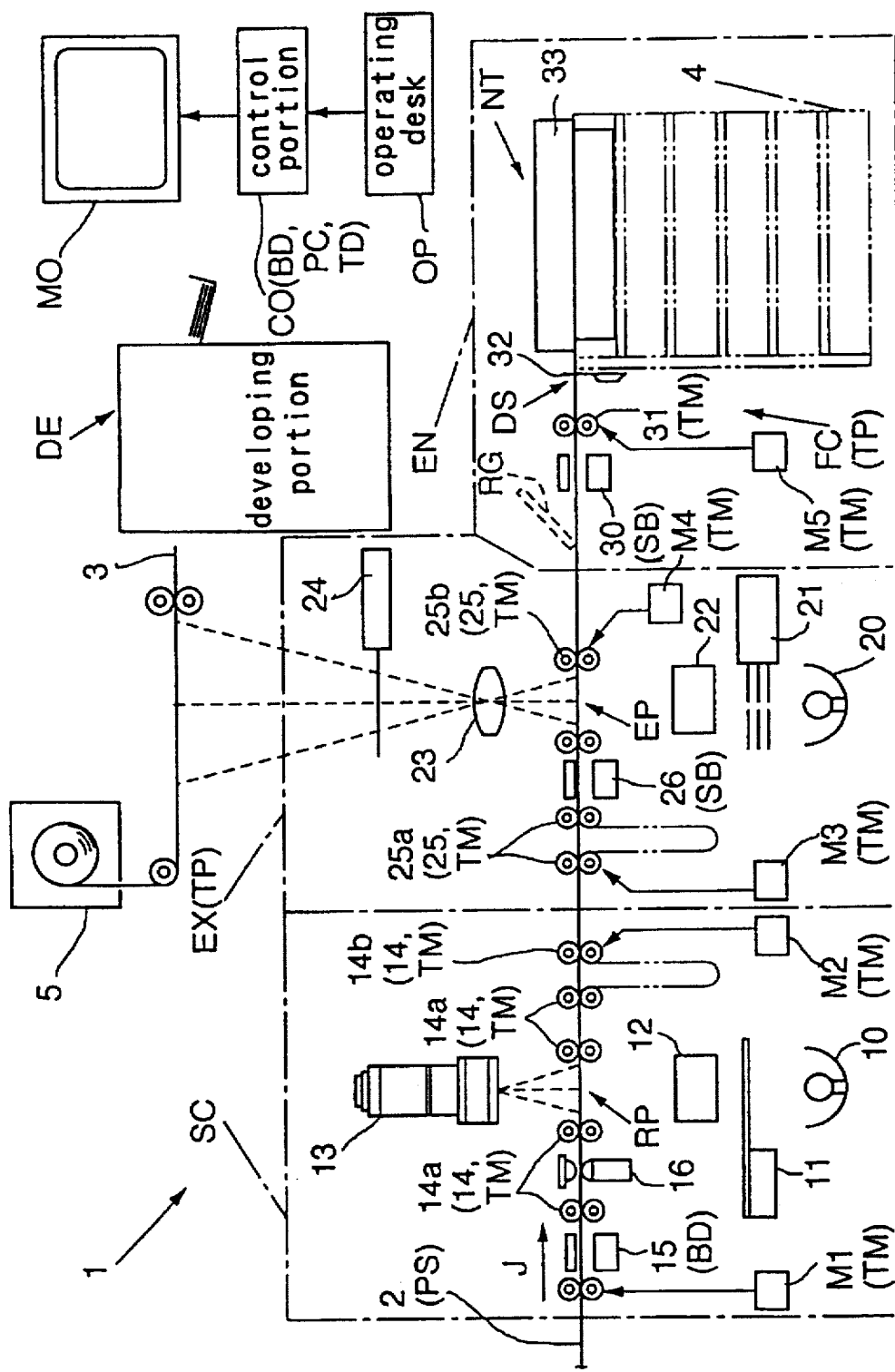
FIG. 1 is a schematic diagram of a system according to the invention.

FIG. 1 shows a photographic printer 1. There is a scanner portion SC to read a picture from photographic film 2 (as an example of photosensitive material PS), which has a plurality of picture frames recorded serially thereon. There is an exposure portion EX to expose the picture on film 2 to printing paper 3 and a negative sheets storage portion EN to store negative sheets 4 which are cut after each six frames of film 2 is exposed. There is a developing portion DE to develop the exposed picture on film 2 onto printing paper 3 and a control portion CO to control each portion. The circuit diagrams for the control portion CO and other portions are not shown for ease of readability.

Scanner portion SC comprises a scanning light source 10, ND filter 11, which can vary the amount of transmitted light it passes through, or some other contrast adjusting means, mirror tunnel 12 to uniformly transmit light emerging from ND filter 11, and CCD image sensor unit 13 which is aligned with the shaft of light from tunnel 12. There are advancing rollers 14 to advance the film 2 in the direction of arrow J across the light axis between tunnel 12 and sensor unit 13. As the film 2 is advanced along the advancing path, a picture detector 15 formed by a transmitted type light sensor, detects the edge portion of a picture and a DX sensor 16 reads the DX code recorded in film 2.

When a modify command for positioning of the film 2 appears on monitor MO, as described later, ND filter 11 provides contrast adjusting means which functions to adjust the contrast between a frame picture part and an outside picture part. CCD image sensor unit 13 measures and adjusts light quantity. For example, contrast adjustment is done by processing the signal read by CCD image sensor unit 13. Accordingly, more effective contrast adjustment can be achieved.

CCD image sensor unit 13 has a CCD image sensor and a lens system for imaging a picture from the film 2 onto CCD image sensor and splitting the picture from the film 2 into several areas, and reading density information of the three basic colors in each area.

Among advancing rollers 14 are advancing rollers 14b positioned at the most output-side of the advancing path of the film 2, which is driven by pulse motor M2, and advancing rollers 14a which are gear-driven by pulse motor M1. A loop of film 2 can be formed on the input-side of advancing rollers 14b by gear-driven pulse motor M1 and pulse motor M2.

Figure 2A:
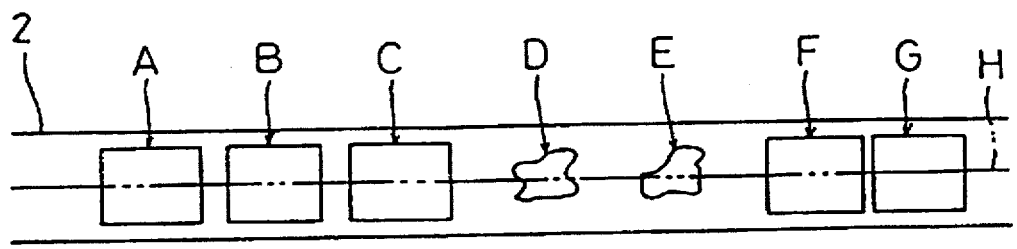
FIG. 2(a) is a plan view of a sample film being considered.

Picture detector 15, for instance, detects frames A to G which are serially arranged as shown in FIG. 2(a). Frames A to C were taken with standard exposure and arranged with satisfactory spacing. Frames D and E show that the density difference is not clear between the surrounding part and the other part of the frame due to underexposure. Frames F and G were taken with standard exposure but with extremely narrow spacing. The transmitted quantity of light is measured along with the central line of FIG. 2(a). Picture detector 15 will output the signal shown in FIG. 2(b) for the picture frames of FIG. 2(a).

Figure 2B:
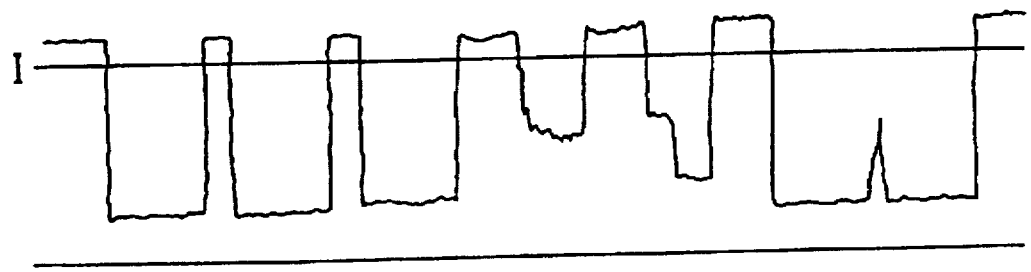
FIG. 2(b) is a diagram of the corresponding signals to FIG. 2(a).
Figure 2C:
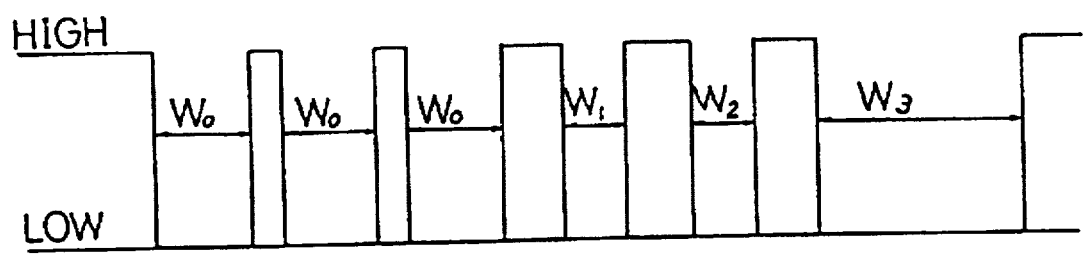
FIG. 2(c) is a diagram of the corresponding signals to FIG. 2(b).

The detected information of picture detector 15 is sent to control portion CO, which then compares the advanced signal against the standard value shown as straight line "T" of FIG. 2(b), transmitted light under standard value as "L" level shows transmitted density over standard value; and transmitted light over standard value as "H" level showing transmitted density under standard value, to obtain the signals shown in FIG. 2(c) in two value form.

FIG. 2(c), where frames A to C are taken with standard exposure and satisfactory spacing arrangement, specifies width WO to be equivalent to the width of one standard frame along advancing direction of film 2. But in frames D and E, the density difference between the surrounding part and the other part is not clear due to underexposure, so widths W1 and W2 of the "L" level are narrower than WO. And frames F and G were taken with a standard exposure condition but with extremely narrow spacing between the two frames. The part between frames F and G cannot be clearly determined and so width W3 of the "L" level is wider than WO.

Control portion CO will judge the picture boundary as being satisfactorily determined if this "L" level width is within a set range, that range being centered about the width of one standard frame picture along the advancing direction of film 2. Determination of the picture boundary will be judged as unsatisfactory if it is outside the set range. Consequently, picture detector 15 and control portion CO act as boundary determining means BD to determine the picture boundary between adjacent frames.

When film 2 is inserted frame by frame into scanner portion SC by advancing rollers 14, the picture will be read at picture information reading position RP. This reading of film 2 continues until one order is finished, and the pictures read are sent to control portion CO for determination of exposure conditions at exposure portion EX. The portion of film 2 which has been read forms a loop and is stored at the input-side of advancing rollers 14b on the most output-side of the film advancing path.

Position control of the advancing direction of film 2 to satisfactorily place the picture part of the film at the picture information reading position RP, will be executed by control portion CO based on detected information at picture detector 15 as described later. The left-right direction of the advancing direction of film 2 will be regulated by a guide (not shown).

As a part of processing portion TP, exposure portion EX exposes the advanced film 2. Exposure portion EX comprises: exposure light source 20; modulating filter 21 equipped with each color filter of Y (yellow), M (magenta) and C (cyan) adjusting the color balance of emitting light from exposure light source 20; a mirror tunnel 22 uniformly mixing passing light of the modulator filter 21; zoom lens 23 forming the picture of film 2 on printing paper 3; and shutter 24, all on the same light axis. Advancing rollers 25 are equipped to advance film 2 in the direction of arrow J to cross the light axis between mirror tunnel 22 and zoom lens 23. There is a position detector 26 formed by a transmitted type light sensor for determining the position of film 2 along its advancing path.

Part of the advancing rollers 25 is advancing rollers 25a placed at the input-side of the advancing path of film 2 and driven by a pulse motor M3. Other advancing rollers 25b are gear-driven by pulse motor M4. M3 and M4 drive independently so that film 2 can form a loop at the output-side of advancing rollers 25a of the most input-side of the film advancing path in exposure portion EX.

After finishing the picture reading at scanner portion SC, film 2 is delivered to exposure portion EX, and is formed in a loop and stored at the output-side of advancing rollers 25a on the most input-side, sequentially advancing to exposure position EP frame by frame. Regarding positioning of the picture part of film 2 at exposure position EP, left/right positioning of film 2 in the film advancing direction is regulated by a guide (not shown), so that position control of the advancing direction of film 2 is needed. This position control (to be described later), is provided by positioning control means based on detected information of picture detector 15.

A frame of film 2 placed at exposure portion EP is then exposed on printing paper 3 pulled from a printing paper magazine 5. The exposure condition set by control portion CO through regulating filter 21 and shutter 24, is based on density information of the picture on that frame exposed to printing paper 3.

Negative sheet storing portion EN includes a film cutting portion FC and a negative sheet advancing portion NT. Film cutting portion FC is part of the processing portion TP and cuts every six frames of advanced film 2. Film cutting portion FC has a transmitted type light sensor along the advancing path of film 2, position detector 30 for determining the position of film 2, advancing rollers 31 driven by pulse motor M5, and film cutter 32 for cutting (every six) frames of film 2. On the input-side of the advancing path of film 2 in the negative sheet storing portion EN (that is, the input-side of position detector 30), the removal of film 2 from its advancing path is effected by advancing path opening gate RG of the swingable type. Advancing path opening gate RG is switchable between an advancing state and a discharging state. In the advancing state, gate RG guides film 2 toward negative sheet storing portion EN. In the discharging state (as shown in dotted lines in FIG. 1), gate RG, swung upwardly, opens for removal of film 2.

Negative sheet advancing portion NT includes a negative sheet storage portion (not shown) from which negative sheets 4 are pulled from in the advanced direction of film 2. Negative sheet cutter 33 cuts advanced negative sheet 4 stepwise in a direction perpendicular to the direction of film 2.

Upon finishing exposure at exposure portion EX, film advanced to negative sheet storing portion EN will be inserted into negative sheets 4 advanced in the direction perpendicular to the advancing direction of film 2 and cut in units of six continuous frames by film cutter 32. This cut positioning needs positioning control in the advancing direction of film 2. And this positioning control will be executed based on detected information of the picture detector 15 by control portion CO which functions as position control means PC as described later.

Negative sheets 4, upon being advanced in step by step condition with insertion of film 2 at each step, will then be cut into each order by negative sheet cutter 33 equipped on the negative sheet advancing path.

As described above, film 2 inserted at scanner portion SC is sequentially advanced from the scanner portion SC until negative sheet inserting portion EN by pulse motors M1, M2, M3, M4, M5 and advancing rollers 14, 25 and 31 functioning as advancing means TM to advance film 2.

Developing portion DE has plural tanks (not shown) filled with processing solution to develop the printing paper 3 after exposure. Printing paper 3 is developed by sequentially passing through plural tanks.

AS described above, control portion CO controls each of the following portions: exposure condition setting at exposure portion EX, picture reading position RP of scanner portion SC, exposure position EP and the cut positioning at film cutter 32 of negative sheet storing portion EN.

The exposure condition is set based on density information of the picture of film 2 read at scanner portion SC as the inserting quantity is exposed to the light path of each color filter of regulating filter and the opening duration of the shutter 24 at exposure portion EX.

Then the picture on printing paper 3 exposed at the setting exposure condition is simulated and shown on monitor MO. Operator, watching the simulated picture on monitor MO, judges the exposure condition by input of a modify command from the operating desk OP if necessary.

Positioning of the picture information reading position RP, exposure position EP and cut position of film 2 is executed based on information of the boundary determining means BD and the advanced quantity of film 2.

The advanced quantity of film 2 is determined by the transmitted pulse numbers to each pulse motor M1, M2, M3, M4 and M5 from control portion CO. Control portion CO functions as the advanced quantity determining means TD to determine the advanced quantity of film 2 by advancing means TM.

Figure 3:
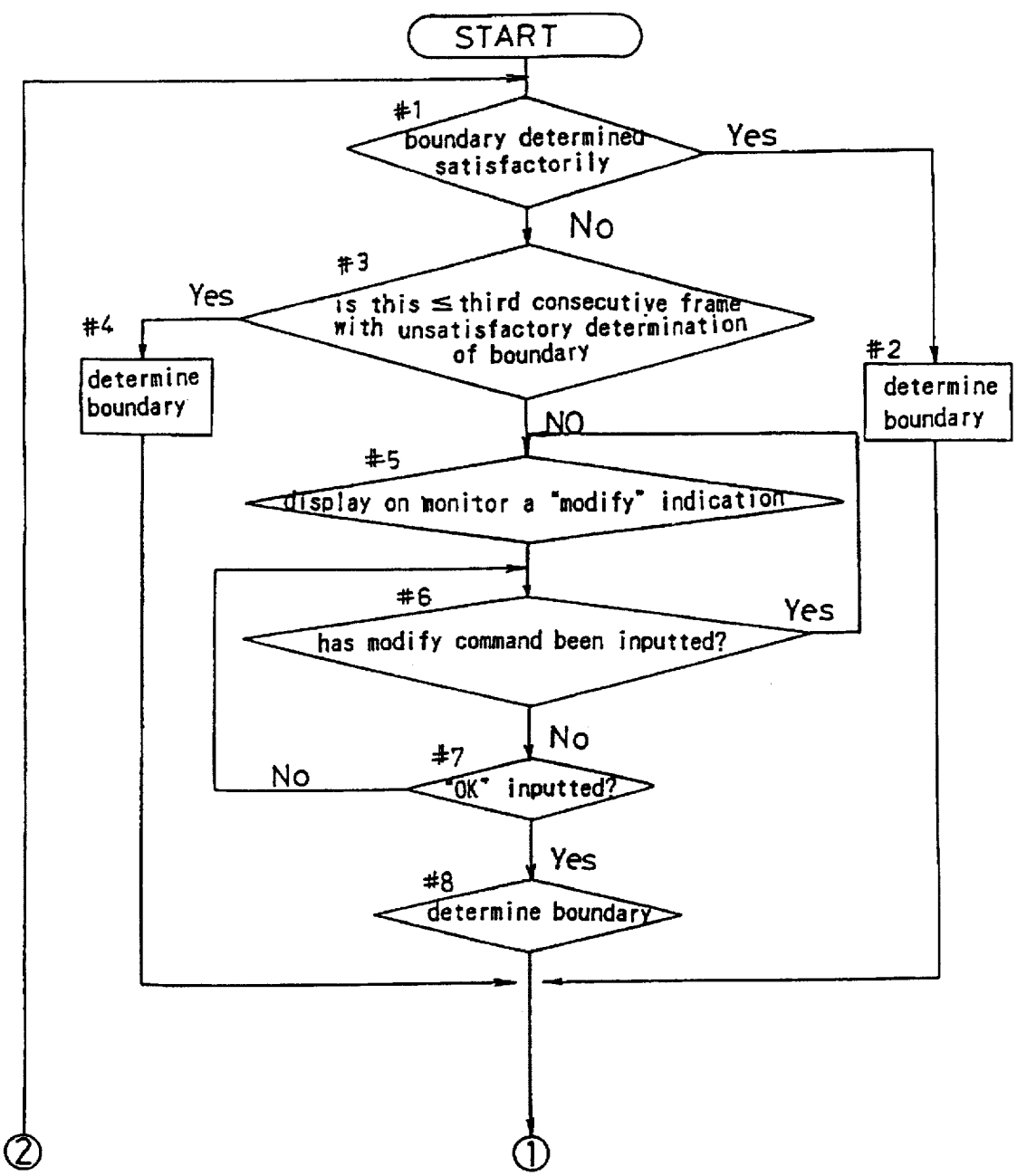
FIG. 3 is a flow chart of the logic operations of the invention.
Figure 4:
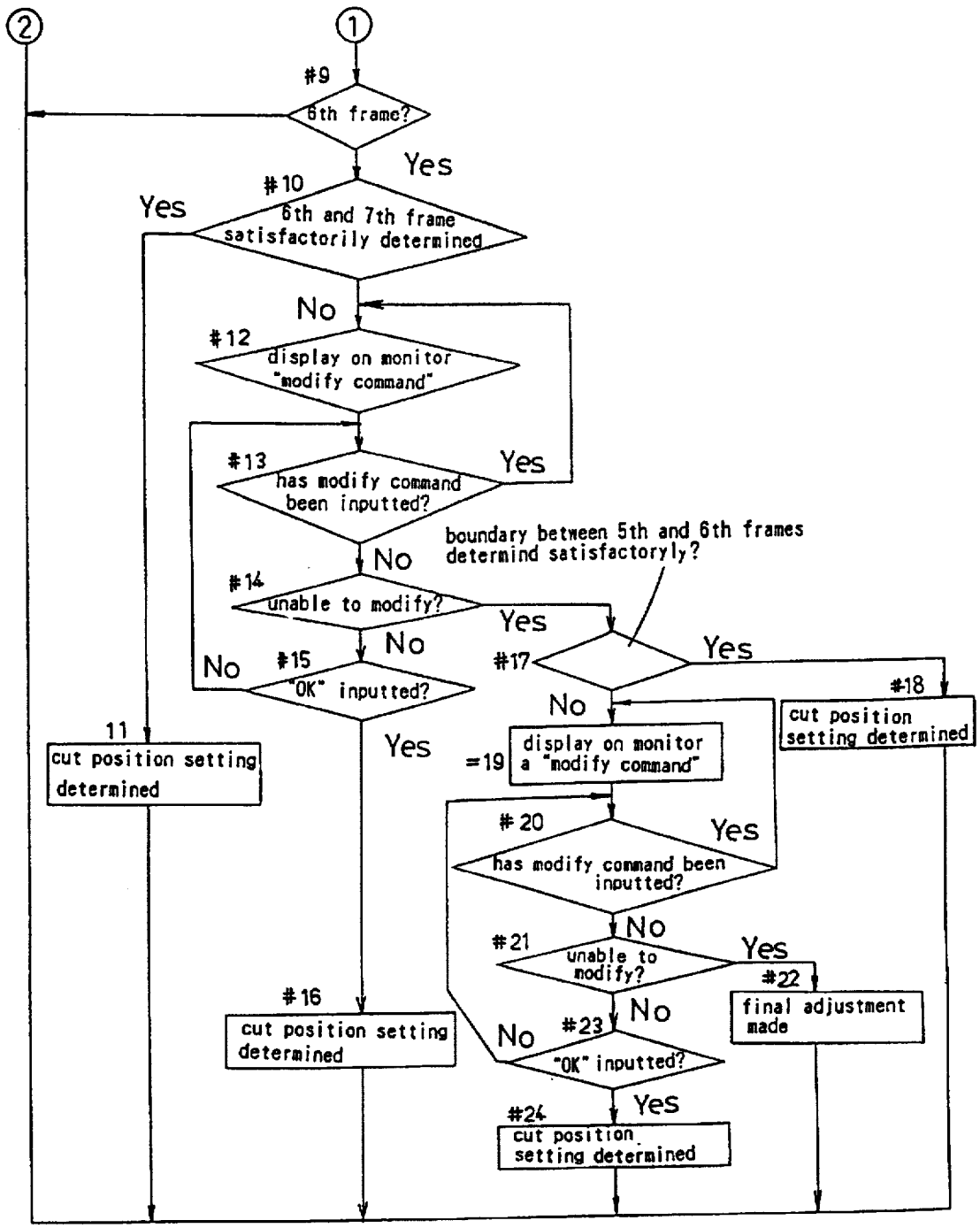
FIG. 4 is a continuation of the flowchart of FIG. 3.

Following the flow chart of FIGS. 3 and 4, the positioning process by control portion CO will be described.

First, if the picture boundary has been satisfactorily determined (step 1), based on the determined signal shown in FIG. 2(c) (i.e. advanced quantity of film 2 corresponding to positions of down to "L" level from "H" level and up to "H" level from "L" level), then the process sets the boundary (step 2) identified as coordinates of the picture boundary of film 2. These coordinates can be shown by referring to the front edge or edge part of the picture of the front frame of film 2.

Figure 5A:
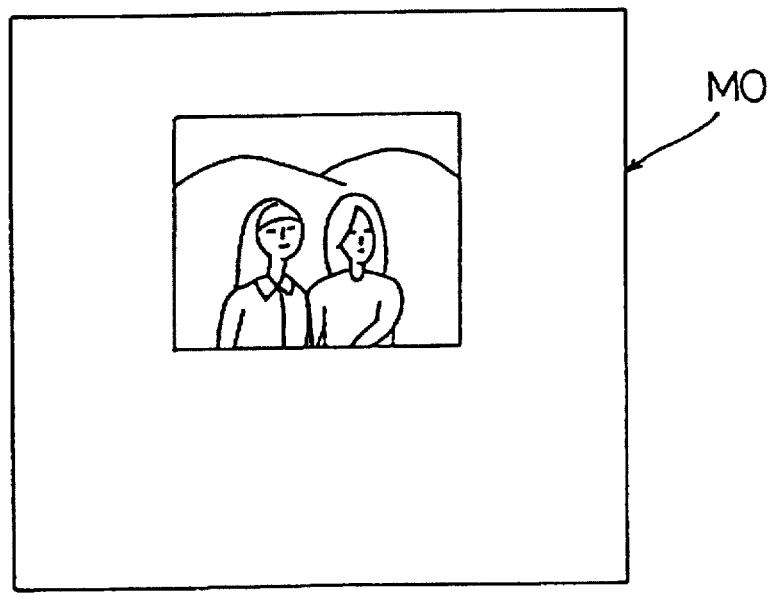
FIG. 5(a) is a monitor display.
Figure 5B:
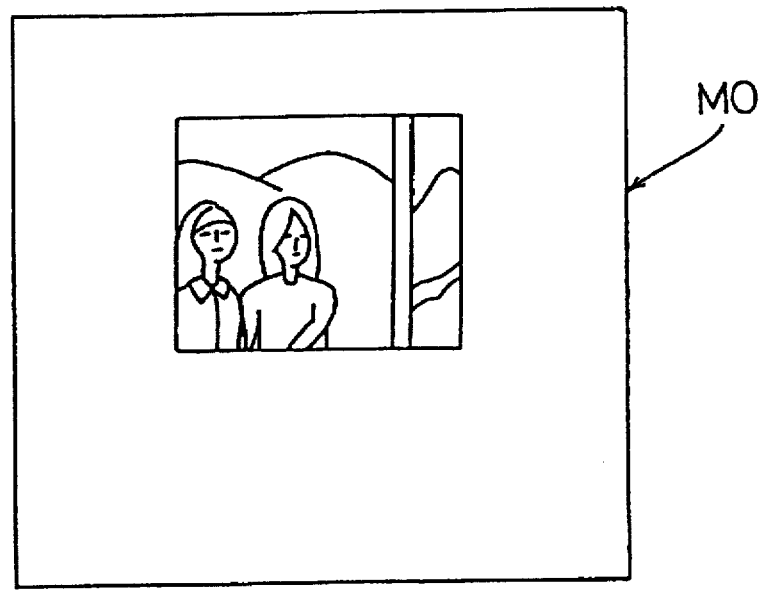
FIG. 5(b) is a monitor display.

If a boundary cannot be determined satisfactorily, then it will be assumed that one standard frame is present and the film 2 will be advanced forward one standard amount. This will occur while the number of continuous frames for which a boundary cannot be satisfactorily determined is three or less (steps 3 and 4 in FIG. 3). In case of the fourth such continuous frame, a picture of it will be taken at RP, and the picture and a suitable message will be displayed by the monitor (MO) (step 5 in FIG. 3; and FIG. 5).

Where the monitor MO displays the subject part of the frame picture of film 2 as shown in FIG. 5(a), the operator just inputs "OK" without the need for inputting a modify command from operating desk OP. Where the monitor MO, as shown in FIG. 5(b), displays a part which should not be included, the operator inputs a modify command from operating desk OP to move film 2 in the desired direction until a satisfactory condition as shown in FIG. 5(a) is achieved. Control portion CO drives pulse motor M1 corresponding to this input, while renewing the modify indication for the changed position of film 2. With an "OK" input, it is determined that picture boundary is satisfactorily moved by the modify command (steps 5–8).

Meanwhile, by moving ND filter 11 of scanner portion SC on command of the operating desk OP, the light quantity on film 2 can be adjusted. The operator adjusts the contrast between the other part and the picture part displayed on monitor MO and adjusts the light quantity to view the picture easily.

Upon determining the picture boundary, positioning of the cut setting place of the film 2 is executed on every six frames in principle. If the sixth frame from the last cut position setting is set, the process for determining the following cut position setting will be executed. The process returns to step 1 if it is not yet the sixth frame (step 9).

When the picture boundary between the sixth and seventh frames is satisfactorily determined, the cut position will be set in the middle of the part between the rear end boundary of the sixth frame and the front end boundary of the seventh frame (steps 10, 11). Then there is a return to step 1.

If the picture boundary of the sixth or seventh frames or both is unsatisfactory (step 10), the operator executes the process of cut position setting by doing the following.

Figure 6:
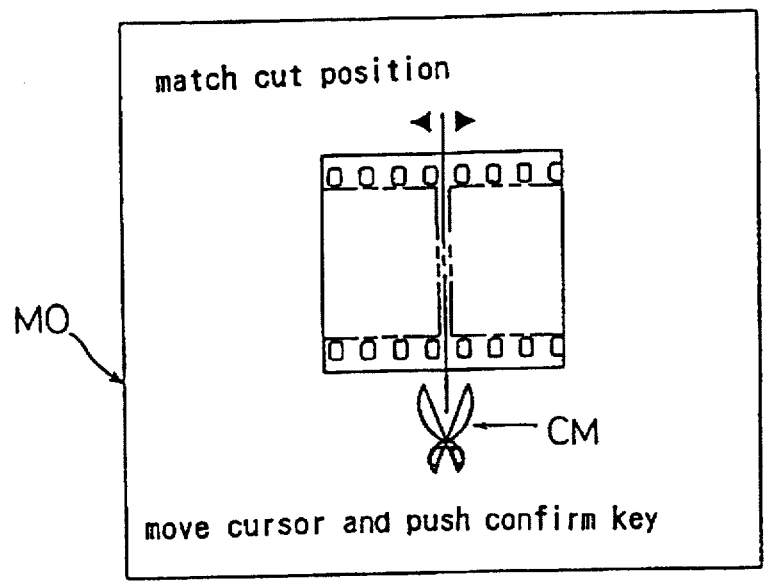
FIG. 6 is a monitor display.

The place assumed as the unclear part between the sixth and seventh frames of the advanced quantity of film 2, is put at the center of the picture information reading means RP and read by image sensor unit 13, as shown in FIG. 6. The modifying process shown on monitor MO will be executed with cut mark CM shown at the cut position setting on the advanced quantity of film 2 (step 12).

The operator, watching the display on monitor MO, inputs a modify command from operating desk OP until the cut mark CM reaches the desired position (step 13). Control portion CO, then moves cut mark CM on monitor MO corresponding to the input of the modify command (step 12).

As operator inputs "OK" from operating desk OP (step 15) by moving cut mark CM to the desired position, control portion CO then determines the coordinates of the cut position setting at cut mark CM.

Meanwhile, similarly to the process for positioning at picture information reading position RP and exposure position EP, light quantity onto the film 2 can be adjusted by moving ND filter 11 of scanner portion SC upon operator commands from operating desk OP. The operator can adjust the light quantity in order to easily see the unclear part between the sixth and seventh frames shown on display of monitor MO.

The above situation relates to the situation where the unclear part between sixth and seventh frames can be identified. If that part cannot be identified even after adjustment of the light quantity by moving ND filter 11, and upon input of an unable-to-modify message from operating desk OP by the operator (step 14), then the satisfactory determination of the boundaries of the fifth and sixth frames (step 17) is considered. When both boundaries are satisfactory, the central part between the fifth and sixth frames is set as the cut position setting (step 18).

If for either the fifth or sixth frames or both, determination of the picture boundary is unsatisfactory, the cut position setting should be set at the unclear part between fifth and sixth frames, film 2 is reversed one frame, and the same process described above is executed for the setting of cut position setting between the sixth and seventh frames (steps 19-24).

If the operator cannot identify the unclear part between the fifth and sixth frames even by adjusting the light quantity with movement of ND filter 11, he inputs an unable-to-modify message form operating desk OP (step 21), and then ends the process for cut position setting determination on monitor MO. The part between the sixth and seventh frames which had been estimated originally as the cut position setting will be automatically registered as the final visual adjustment place. The process returns to step 1 for processing of the next frame. Moreover, this unable-to-modify place registered as the final adjustment place will be transferred to the location of film cutter 32 of negative sheet storing portion EN at advancing means TM based on the indication of control portion CO, and stopped automatically. Therefore, operating desk OP acts based on the modify input means receiving an input modify command to position the film 2 by position control means PC.

The picture boundary is determined as described above, and upon cut position setting being set, advancing means TM will advance film 2 according to the coordinate information of the detected picture boundary. A picture of satisfactorily positioned film 2 is read at the picture information reading position RP. A picture of satisfactorily positioned film 2 is exposed to printing paper 3 at the exposure position EP. Advancing means TM advances film 2 positioned by the coordinate information of the set cut position setting, and film 2 is cut at a satisfactorily positioned cut position setting at the position of the film cutter 32 in negative sheet storing portion EN. At this point, position detector 26 in exposure portion EX and position detector 30 in negative sheet storing portion EN detect the same signal as shown in FIG. 2. Control portion CO compares the detected information of position detector 26 or 30 with the set coordinate information of the picture boundary and determines the difference between the advanced quantity determined by picture detector 15 and that determined by position detector 26 or 30. Advancing will be stopped and the necessary process of modifying the advanced quantity if the actual advanced quantity is bigger than a set value. Accordingly, position detectors 26 and 30 function as auxiliary boundary determining means SB to determine the picture boundary between adjacent frames at the immediate input-side of process portion TP.

On the other hand, upon a final adjustment registration by control portion CO (at step 22), the operator stops film cutter 32 and visually positions the film for cutting by film cutter 32. Consequently, by visually setting film 2 relative to the position of film cutter 32 of negative sheet storing portion EN, that position functions as a position deciding stage.

If the operator feels uneasy about the positioning process because too many frame boundaries were unsatisfactorily determined or the cutting function was not performed well, then film 2 can be picked from its advancing path before film cutter 32 by a command from operating desk OP to swing open the advancing path opening gate RG placed at the input-side of position detector 30 in negative sheet storing portion EN.

Other embodiments include the following.

(1) In the above-described embodiment, during determination of the cut position setting of film 2 when the picture boundary cannot be satisfactorily determined at the boundary determining means BD, the place set as the cut position setting is shown on monitor MO. Two modes are possible: the operator moves cut mark CM showing cut position setting to determine the cut position or cut mark CM is fixed and the film 2 is moved by an operator command.

Figure 7:
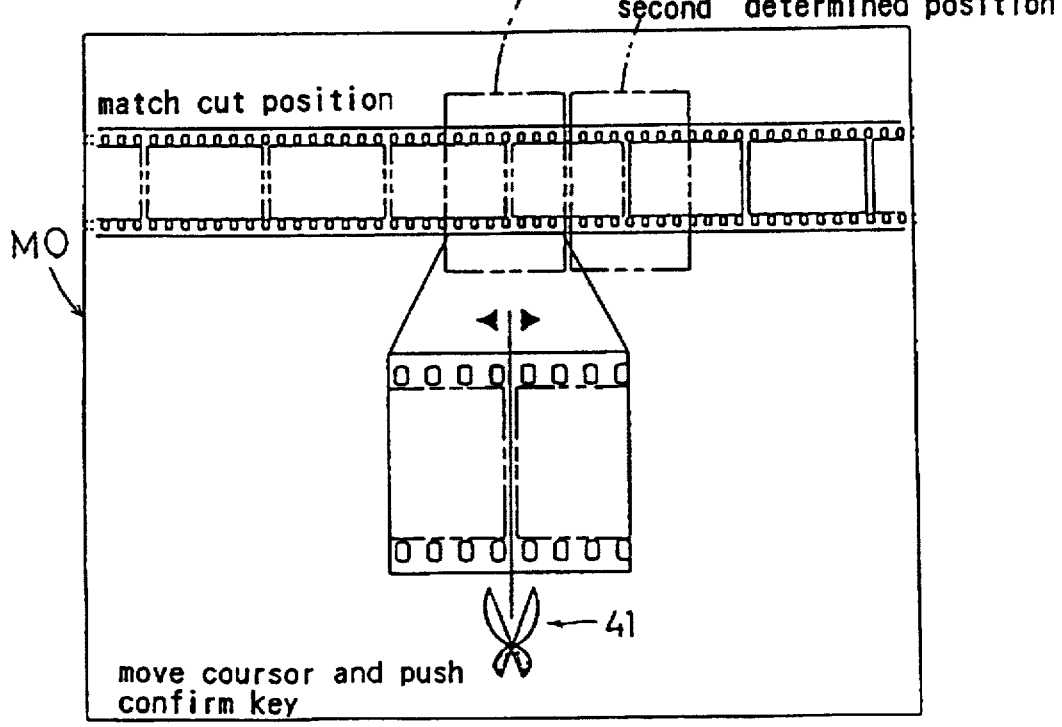
FIG. 7 is a monitor display.
Figure 8:
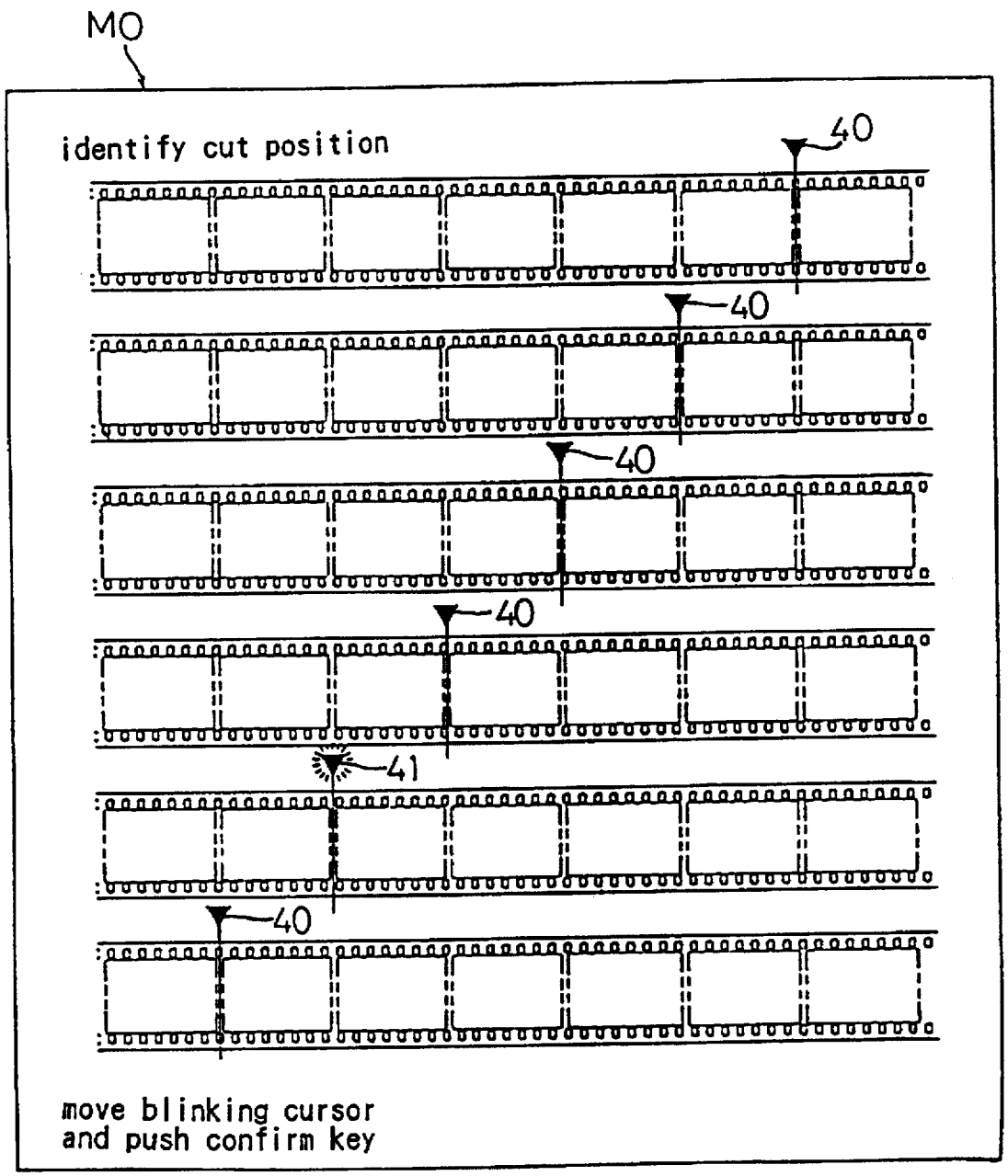
FIG. 8 is a monitor display.

(2) In the above-described embodiment, during determination of the cut position setting of film 2 when the picture boundary cannot be satisfactorily determined at the boundary determining means BD, while the monitor MO shows each part before and after the frame of the estimating place as the cut position setting, it is permissible to determine the cutting position by reading the picture of six frames as shown in FIG. 7 or by showing all frames of one order as shown in FIG. 8.

As shown in FIG. 7, the monitor may display six frames with some frames positioned before and after a modify position index 41. The index 41 shows the estimated position as the cut position setting from the advanced quantity of film 2. The display includes a first set position between the sixth and seventh frames and a second set position between the fifth and sixth frames. The index 41 is switchable to set the position of the cut position setting at the second set position if the cut position determination at the first set position (shown in an enlarged condition) is difficult and the number of frames in this indicating condition is satisfactorily changeable.

Further, the monitor may display all frames of one order as shown in FIG. 8. Where the picture boundary was satisfactorily determined at the boundary determining means BD, a set position index 40 shows the determined position as the cut position setting. Where the picture boundary cannot be determined at the boundary determining means BD, a modify position index 41, indicated by blinking cursor, is shown for necessary determination of cut position setting by the operator. This indicating condition is not limited to showing all pictures of one order. It is suitable with any range of frames which includes both a set position index 40 and a modify position index 41.

The operator, in either case of above-described, inputs a modify command from operating desk OP to move the modify position index 41 to a part between adjacent frames, and sets the cut position setting therein.

The above indicating states shown in FIGS. 7 and 8 can also be adapted to position control for positioning a frame at the exposure means EX. In this locating control, instead of the cut mark CM in FIG. 7 and modify position index 41 in FIG. 8, while showing a picture part of frame or an exposed territory at exposure position EP of film 2, it is permissible to input a modify command by moving the indicating position of a rectangular frame from operating desk OP.

And, in the indicating states shown in FIGS. 7 and 8, after the scanner SC reads the pictures of one order or of plural frames, the process of above-described positioning has been executed.

(3) In the above-described embodiment, exposure portion EX and scanner portion SC are independently equipped, but by means of moveable reflective mirror, etc. to light path for exposure at exposure portion EX to branch out light after getting through film 2, CD image sensor unit 13 is constructed to guide it. It is permissible to construct exposure portion EX and scanner portion SC together in one body.

(4) In the above-described embodiment, process portion TP is composed of both the exposure portion EX and the film cutter FC of the negative sheet storing portion EN, but it is also permissible to be equipped with only one of them.

(5) In the above-described embodiment, control portion CO itself functions as the advanced quantity determining means TD to determine the conveyed quantity of film by the number of pulses sent from control portion CO to each composing component of the advancing means TM, pulse motors M1, M2, M3, M4 and M5. However, it is also permissible to determine the advanced quantity of film 2 based on the number of rotations of the above-described motors with a rotary encoder, etc., functioning as advanced quantity determining means TD.

(6) In the above-described embodiment, regarding frame positioning at scanner portion SC and exposure portion EX, it is so constructed that a setting quantity will be transmitted for a frame for which a picture boundary cannot be satisfactorily determined by boundary determining means BD while the number of continuous undeterminable frame boundaries is within three, but this setting number of frames is changeable.

(7) In the above-described embodiment, the amount of light to ND filter 11 can be adjusted as a function of contrast adjusting means. It is permissible to adjust the focus of the CCD image sensor unit 13 in order to adjust the light amount, or to adjust the light measuring time of the CCD image sensor unit 13 in order to equivalently adjust the light amount measured by CCD image sensor unit 13. And it is also permissible to adjust the contrast by processing picture information read at CCD image sensor unit 13.

(8) In the above-described embodiment, film 2 is an example of photosensitive material PS. It is permissible to treat printing paper in the shape of a continued sheet of finished exposure as photosensitive material PS and to adapt the invention to cutting equipment of printing paper of finished exposure.

(9) In the above-described embodiment, when the operator cannot identify an unclear part by watching display on monitor MO, and although it is so constructed to transmit its unable-to-position place to positioning stage (DS) upon input of an unable-to-modify message from operating desk OP, it is so controlled by control portion CO that the film 2 for the modifying process will be transmitted to gate RG when there is further input of an unable-to-modify message. It is also permissible to construct the invention so that the film 2 will be discharged from the advancing path by switching from the advance-state to discharge-state.

While a particular embodiment of the invention has been disclosed, it is to be understood that various different modifications are possible and are contemplated as being within the true spirit and scope of the claims.

We claim:

1. A photosensitive material processing apparatus, comprising:
    (a) advancing means for advancing photosensitive material having frames of pictures recorded serially thereon;
    (b) advanced quantity determining means for determining the quantity of photosensitive material which has been advanced by said advancing means;
    (c) boundary determining means for determining a picture boundary between adjacent frames on the photosensitive material advanced by said advancing means;
    (d) processing means for processing the photosensitive material;
    (e) position control means for determining and controlling the position of the photosensitive material based upon information determined by said advanced quantity determining means and said boundary determining means at said processing means;
    (f) modification input means for inputting a command to modify the position of the photosensitive material by said position control means;
    (g) picture reading means for reading pictures of the photosensitive material on an input-side of said processing means;
    (h) display means for displaying information read by said picture reading means and for displaying an indication to modify the position of the photosensitive material by said position control means when said boundary determining means makes an unsatisfactory determination of a boundary between adjacent frames based upon information read by said picture reading means;
    wherein an unsatisfactory determined picture boundary between adjacent frames is set by said modification input means and said position control means based on the indication.

2. The apparatus of claim 1, wherein said display means is a monitor and upon the unsatisfactory determination of a boundary, said position control means displays on said monitor: (i) a modify position index based upon an advanced quantity of photosensitive material and (ii) a set position index based upon determined information of the picture boundary by said picture reading means and said boundary determining means.

3. The apparatus of claim 1 wherein when said boundary determining means has made an unsatisfactory determination, said position control means displays on said display means the preceding and following positioned plurality of picture frames with a modify position index, based upon information read by said picture reading means, from an advanced quantity of photosensitive material.

4. The apparatus as in one of claims 1 to 3 further comprising a positioning stage for the visual determination of the position of the photosensitive material, wherein when said position control means receives an unable-to-modify message input from said modification input means, the position of the photosensitive material corresponding to the unable-to-modify message, is advanced to said positioning stage, and said advancing means is automatically stopped.

5. The apparatus of claim 1 further including an advancing path opening gate at the input-side of said processing means on an advancing path of the photosensitive material, which is switchable between (i) an advancing state where the photosensitive material can be advanced towards said processing means and (ii) a discharging state where the photosensitive material can be removed from the advancing path.

6. The apparatus of claim 5, wherein said position control means switches said gate from said advancing state to said discharging state, and advances the photosensitive material to said gate upon an input of an unable-to-modify message by said modification input means.

7. The apparatus of claim 1 further comprising auxiliary boundary determining means for determining the picture boundary of said photosensitive material between adjacent frames at an initial position at the input-side of said processing means of an advancing path of the photosensitive material, and said position control means compares determined information between said boundary determining means and said auxiliary boundary determining means to detect a difference of an advanced quantity of the photosensitive material at each determining means.

8. The apparatus of claim 1, further comprising contrast adjusting means for adjusting picture contrast based on information read by said picture reading means and displayed on said display means.

9. The apparatus of claim 1 wherein said photosensitive material is a film and said processing means has a projected exposure portion for exposing a picture on the film, positioned by said position control means, to photographic paper.

10. The apparatus of claim 9 wherein said display means is a monitor and said position control means displays the indication on the monitor when the number of continuous frames for which a boundary cannot be satisfactorily determined by said boundary determining means exceeds a predetermined limit; and said position control means sets the boundary based on an advanced quantity of film equivalent to one frame as the number of picture boundaries unsatisfactorily determined by said boundary determining means continues within said predetermined limit.

11. The apparatus of claim 1 wherein said photosensitive material is a film and said processing means has a film cutting portion for cutting between adjacent frames at a cutting position determined by said position control means.

12. The apparatus of claim 11 wherein upon an unable-to-modify message input by said modification input means, said position control means sets the position between frames nearest an output-side of an advancing path of the film to the determined cutting position, as a new cutting position.

13. The apparatus of claim 11 wherein said display means is a monitor and said position control means determines if there has been a satisfactory determination by said boundary determining means of the boundary of each frame of a preset number of advanced frames from said cut position and displays the indication on the monitor only if the boundary determination of one or more of the preceding or following frames is unsatisfactory.

14. The apparatus of claim 1 wherein said photosensitive material is a film and said processing means has an exposure portion for exposing a picture on the film to photographic paper and a film cutting portion to cut at a predetermined cutting position between adjacent frames of the film.

15. The apparatus of claim 14 wherein said display means is a monitor and said position control means displays the indication on the monitor if the number of continuous unsatisfactory boundary determinations by said boundary determining means exceeds a predetermined limit;

said position control means sets the boundary based on an advanced quantity of film equivalent to one frame if the number of continuous unsatisfactory boundary determinations is within said predetermined limit;

said position control means sets the cutting position upon an advancement of a predetermined number of frames; and said position control means displays the indication on the monitor if a boundary determination between adjacent frames to be cut is unsatisfactory.

16. The apparatus of claim 1 further comprising:

cutting means for cutting between adjacent frames; and said display means is for displaying an indication to modify a cutting position when said boundary determining means makes an unsatisfactory determination of a boundary between adjacent frames to be cut;

wherein the cutting position, between adjacent frames having an unsatisfactorily determined boundary, is set by said modification input means and said position control means.

* * * * *